US010801339B2

(12) United States Patent
Lopez Guzman et al.

(10) Patent No.: US 10,801,339 B2
(45) Date of Patent: Oct. 13, 2020

(54) AIRCRAFT GAS TURBINE ENGINE VARIABLE FAN BLADE MECHANISM

(71) Applicant: General Electric Company, Schenectady, NY (US)

(72) Inventors: Aldo Daniel Lopez Guzman, Guanajuato (MX); Alberto del Angel Duran, Queretaro (MX); Daniela Martinez Arteaga, Queretaro (MX); Carla Garcia Lopez de Llergo, Queretaro (MX); Ileana Prisabel Corona Acosta, Veracruz (MX)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 15/646,460

(22) Filed: Jul. 11, 2017

(65) Prior Publication Data

US 2019/0017396 A1    Jan. 17, 2019

(51) Int. Cl.
 *F01D 7/00*         (2006.01)
 *F01D 7/02*         (2006.01)
 (Continued)

(52) U.S. Cl.
 CPC ................. *F01D 7/00* (2013.01); *F01D 7/02* (2013.01); *F04D 29/362* (2013.01); *B64C 11/30* (2013.01);
 (Continued)

(58) Field of Classification Search
 CPC ... F01D 7/00; F01D 7/02; B64C 11/30; F04D 29/362
 See application file for complete search history.

(56) References Cited

U.S. PATENT DOCUMENTS

| 3,468,473 A | 9/1969 | Davies et al. |
| 3,866,415 A | 2/1975 | Ciokajlo |

(Continued)

FOREIGN PATENT DOCUMENTS

| EP | 3168480 A1 * | 5/2017 | ........... F04D 27/002 |
| EP | 3170985 A1 * | 5/2017 | ............... F01D 7/00 |

(Continued)

OTHER PUBLICATIONS

European Patent Office, "Communication under Rule 71(3) EPC", issued in connection with application No. 18180819.7 dated Nov. 27, 2019, 19 pages.

(Continued)

*Primary Examiner* — Kayla Mccaffrey
*Assistant Examiner* — John S Hunter, Jr.
(74) *Attorney, Agent, or Firm* — Hanley, Flight & Zimmerman, LLC

(57) ABSTRACT

A variable pitch fan assembly includes variable pitch fan blades circumscribed about engine centerline axis coupled to a drive shaft centered about the engine centerline axis. Each blade pivotable about pitch axis perpendicular to centerline axis and having blade turning lever connected thereto. One or more linear actuators non-rotatably mounted parallel to engine centerline axis and operably linked to fan blades for pivoting fan blades and connected to spider ring through thrust bearings for transmission of axial displacement of non-rotatable actuator rods of actuators while the fan blades are rotating. Spider arms extending away from spider ring towards blade roots and each spider arm connected to one of the turning levers. Turning levers may be connected and caromed to spider arms by pin and slot joint. Each spider arm may include joint pin disposed through joint slot of turning lever. Joint slot may be angled or curved.

19 Claims, 3 Drawing Sheets

(51) Int. Cl.
  *F04D 29/36* (2006.01)
  *B64C 11/30* (2006.01)
(52) U.S. Cl.
  CPC ...... *F05D 2220/36* (2013.01); *F05D 2260/74* (2013.01); *F05D 2260/76* (2013.01); *F05D 2260/79* (2013.01)

(56) References Cited

U.S. PATENT DOCUMENTS

| | | | |
|---|---|---|---|
| 3,869,221 A * | 3/1975 | Wildner | .............. F01D 7/00 415/130 |
| 3,870,434 A | 3/1975 | Paulson | |
| 3,873,236 A | 3/1975 | Gall | |
| 4,021,142 A * | 5/1977 | Violette | .............. F02K 3/06 416/167 |
| 4,657,484 A | 4/1987 | Wakeman et al. | |
| 4,662,819 A | 5/1987 | Lakowske et al. | |
| 4,753,572 A | 6/1988 | Kusiak | |
| 4,842,484 A | 6/1989 | Johnson | |
| 4,927,329 A | 5/1990 | Kliman et al. | |
| 5,028,207 A | 7/1991 | Rohra et al. | |
| 5,174,716 A | 12/1992 | Hora et al. | |
| 5,282,719 A | 2/1994 | McCarty et al. | |
| 5,595,474 A | 1/1997 | Girard | |
| 7,264,203 B2 | 9/2007 | Lair | |
| 7,503,750 B1 | 3/2009 | Violette | |
| 8,075,270 B2 | 12/2011 | Violette et al. | |
| 8,272,833 B2 | 9/2012 | Gallet | |
| 8,496,436 B2 | 7/2013 | Perkinson | |
| 8,864,470 B2 | 10/2014 | Belmonte et al. | |
| 9,200,594 B2 | 12/2015 | Bouiller et al. | |
| 9,476,311 B2 | 10/2016 | Krackhardt et al. | |
| 2014/0205457 A1 | 7/2014 | Curlier et al. | |
| 2015/0285262 A1 | 10/2015 | Fabre et al. | |
| 2019/0003484 A1 * | 1/2019 | Morreale | ............ F01D 7/00 |

FOREIGN PATENT DOCUMENTS

| | | | |
|---|---|---|---|
| FR | 3046433 A1 * | 7/2017 | ............ F01D 7/00 |
| WO | 2014060681 | 4/2014 | |

OTHER PUBLICATIONS

European Patent Office, "Extended European Search Report", issued in connection with application No. 18180819.7 dated Oct. 23, 2018, 7 pages.

Canadian Intellectual Property Office, "Office Action", issued in connection with patent application No. 3,009,749 dated Apr. 25, 2019, 5 pages.

Canadian Intellectual Property Office, "Notice of Allowance", issued in connection with patent application No. 3,009,749 dated Oct. 1, 2019, 1 page.

* cited by examiner

AIRCRAFT GAS TURBINE ENGINE VARIABLE FAN BLADE MECHANISM

BACKGROUND OF THE INVENTION

Field of the Invention

The invention relates to aircraft gas turbine engines with variable pitch fan blades and, more particularly, to such fan blades and mechanisms to vary the pitch of the fan blades.

Description of Related Art

It is known in the aircraft gas turbine engine field to provide variable pitch fan blades and mechanisms to vary the pitch of the fan blades. The engines may be ducted or unducted. Variable pitch fan blades increase the overall performance of the engine by setting the optimal angle of the blade for each flight condition. It is highly desirable to have a light-weight, simple, effective, and reliable variable pitch fan blade system and mechanism to vary the pitch of the fan blades.

SUMMARY OF THE INVENTION

A variable pitch fan assembly includes a plurality of variable pitch fan blades circumscribed about an engine centerline axis and coupled to a drive shaft centered about the engine centerline axis, each of the variable pitch fan blades being pivotable or rotatable about a pitch axis perpendicular or normal to the centerline axis and having a blade turning lever connected thereto, one or more linear actuators non-rotatably mounted parallel to the engine centerline axis and operably linked to the fan blades for pivoting or rotating the fan blades about the respective pitch axes, the actuators connected to a spider ring through thrust bearings for transmission of axial displacement of non-rotatable actuator rods of the actuators while the fan blades are rotating, and spider arms extending away from the spider ring towards the blade roots and each one of the spider arms connected to one of the turning levers.

Each of the turning levers may be connected and cammed to a respective one of the spider arms by a pin and slot joint and may be orthogonal or perpendicular to the engine centerline axis and the respective pitch axis. Each of the turning levers may include a joint slot, respective spider arms a joint pin, and the joint pin disposed through the joint slot. The joint slot may be angled or curved for camming the turning lever with respect to the spider arm.

The turning levers may be connected to the fan blades near blade bases or platforms. The turning levers may be integral and monolithic with blade roots of the fan blades with the turning levers extending away from the pressure or suction sides of airfoils of the fan blades. The one or more linear actuators may be connected to a non-rotatable fan structure such as a fan hub frame.

An aircraft turbofan gas turbine engine including a fan, a low pressure compressor or booster, and a high pressure compressor arranged in downstream serial flow communication and circumscribed about an engine centerline axis may incorporate the variable pitch fan assembly.

The fan includes a plurality of variable pitch fan blades circumscribed about the engine centerline axis, the variable pitch fan blades are coupled to a drive shaft centered about the engine centerline axis, each of the variable pitch fan blades are pivotable or rotatable about a pitch axis perpendicular or normal to the centerline axis and having a blade turning lever connected thereto, one or more linear actuators are non-rotatably mounted parallel to the engine centerline axis and operably linked to the fan blades for pivoting or rotating the fan blades about the respective pitch axes, the actuators are connected to a spider ring through thrust bearings for transmission of axial displacement of non-rotatable actuator rods of the actuators while the fan blades are rotating, and spider arms extend away from the spider ring towards the blade roots and each one of the spider arms connected to one of the turning levers. The actuators may be located in a rotor of the engine and radially inwardly of the booster.

BRIEF DESCRIPTION OF THE DRAWINGS

The foregoing aspects and other features of the invention are explained in the following description taken in connection with the accompanying drawings where.

DETAILED DESCRIPTION OF THE INVENTION

Figure 1:
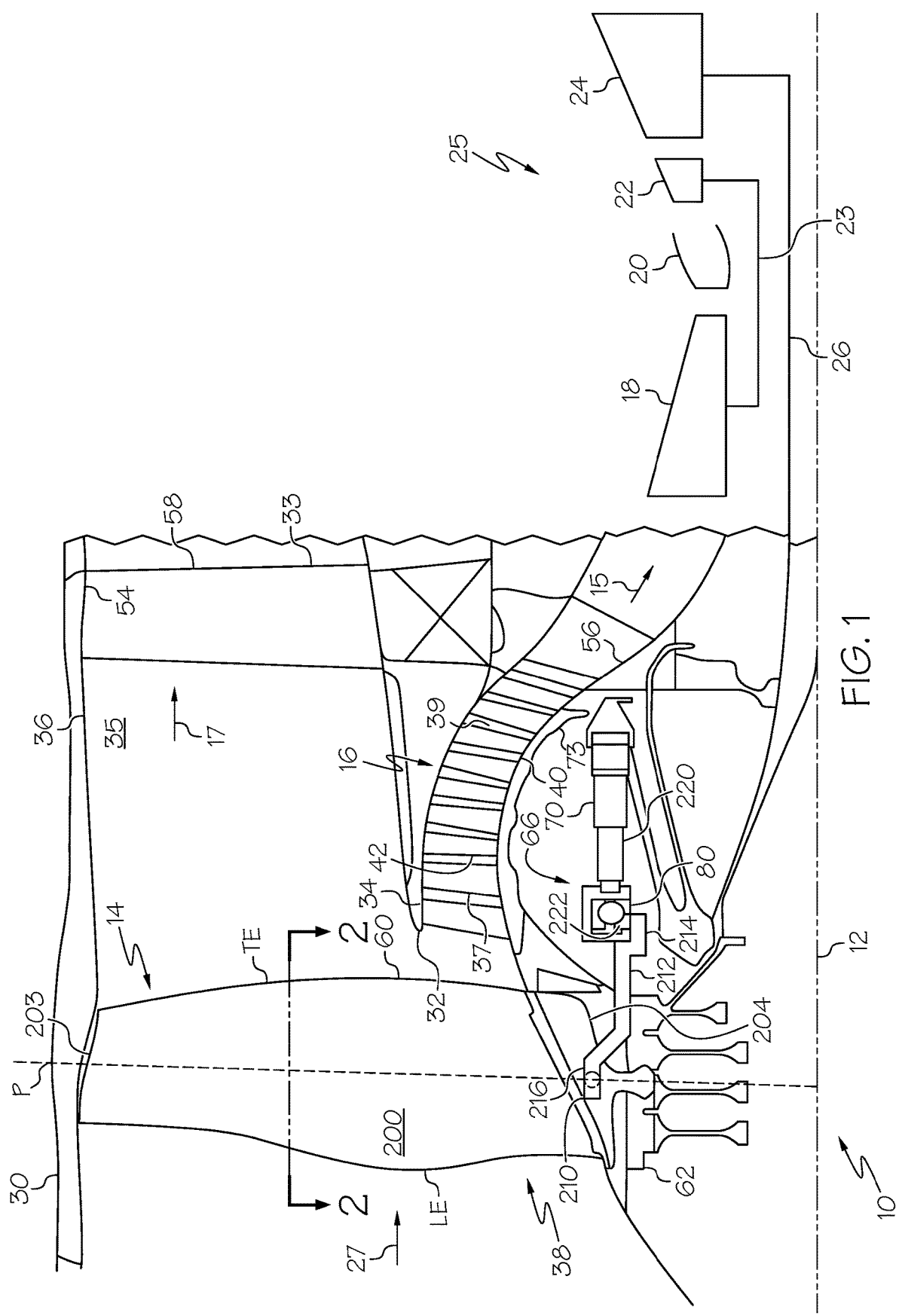
FIG. 1 is a longitudinal part sectional and part diagrammatical view illustration of an exemplary embodiment of an aircraft turbofan gas turbine engine with a variable pitch fan blade and a pitch change mechanism therefore.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a low pressure compressor or booster 16, a high pressure compressor 18, a combustor 20, a high pressure turbine (HPT) 22, and a low pressure turbine (LPT) 24. A core engine 25 includes the HPT or high pressure turbine 22 drivingly connected by a high pressure drive shaft 23 to the high pressure compressor 18 and the combustor 20. The LPT or low pressure turbine 24 is drivingly connected by a low pressure drive shaft 26 to both the fan 14 and the booster 16.

The fan 14 may be rotated about the engine centerline axis 12 by the low pressure drive shaft 26. The fan 14 is a variable pitch fan 38 having a plurality of variable pitch fan blades 60 coupled to and extending radially outwardly from a disk 62 as illustrated in FIG. 1. Each fan blade 60 is pivotable or rotatable about a pitch axis P perpendicular or normal to the centerline axis 12. A pitch actuation mechanism 66 is operable to vary the pitch of the fan blades 60 in unison.

Referring to FIGS. 1-4, each fan blade 60 includes an airfoil 200 extending radially outwardly from a blade base or platform 202 to an airfoil tip 203. The airfoil 200 includes pressure and suction sides 205, 207 extending downstream from a leading edge LE to a trailing edge TE of each of the airfoils 200. A blade root 204 extends radially inwardly from the blade base or platform 202. A fan blade pin or shaft 206 extends radially inwardly from the blade root 204, is rotatably mounted in the disk 62, and is centered and circumscribed about the pitch axis P. A blade turning lever 210 is connected to the fan blade 60 near the blade base or platform 202. The turning lever 210 may be attached to or be integral and monolithic with the blade root 204 and extend away from the pressure or suction side 205, 207 of the airfoil 200.

Referring to FIG. 1, a spider link 212 includes a spider ring 214 with thrust transmitting spider arms 216 disposed around and extending away from the spider ring 214 towards the blade roots 204 and the turning levers 210. There is a one to one numerical relationship between spider arms 216 and the fan blades 60. The spider ring 214 is connected to one or more linear actuators 70 of the pitch actuation mechanism 66. The linear actuators 70 may be hydraulic or electric actuators, non-rotatably mounted parallel to the engine centerline axis 12 and grounded or connected to non-rotatable fan structure such as a fan hub frame 56. The actuators 70 are connected to the spider ring 214 through thrust bearings 80 that enables transmission of axial displacement of non-rotatable actuator rods 220 of the actuators 70 while the fan blades 60 are rotating. A preferred number of the actuators 70 is four. An inner race 222 of each of the thrust bearings 80 is attached to the spider ring 214. The actuators 70 are located in a rotor 73 of the engine 10 radially inwardly of the booster 16.

Figure 2:
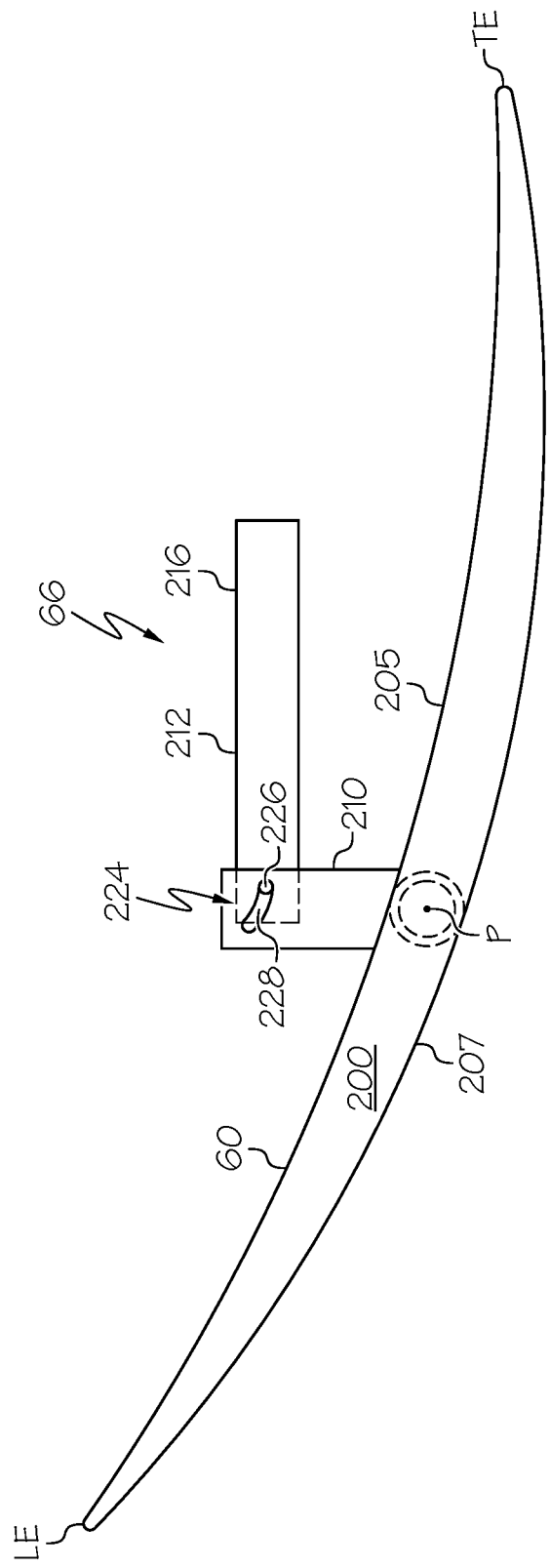
FIG. 2 is an enlarged part sectional and part diagrammatical view illustration of the blade through 2-2 in FIG. 1.
Figure 4:
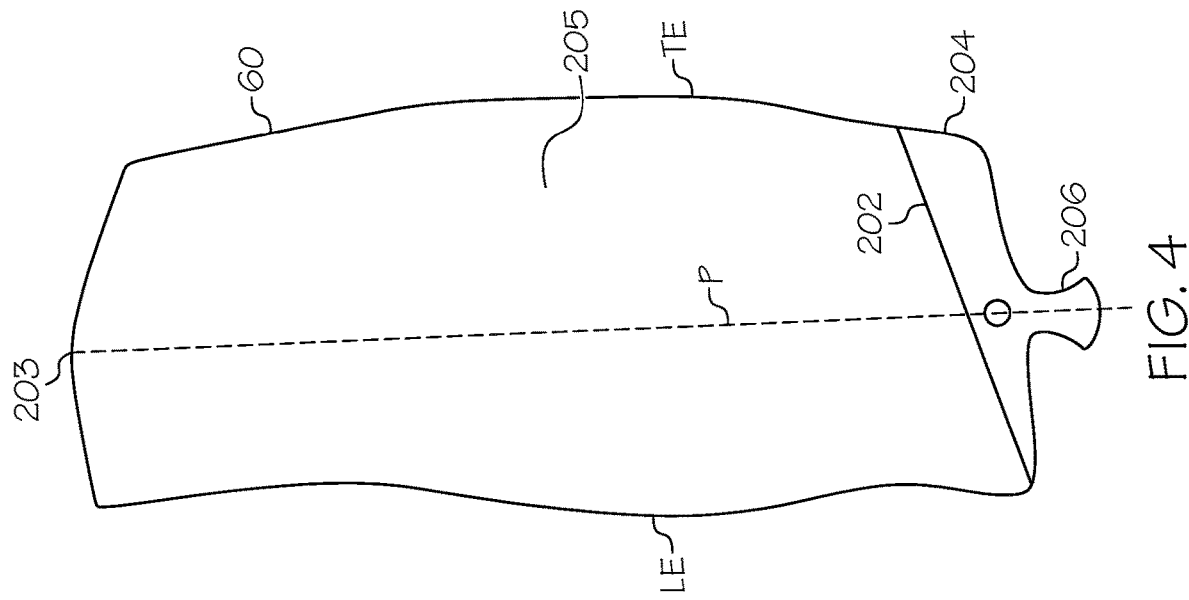
FIG. 4 is a side view illustration of the blade illustrated in FIG. 3.
Figure 3:
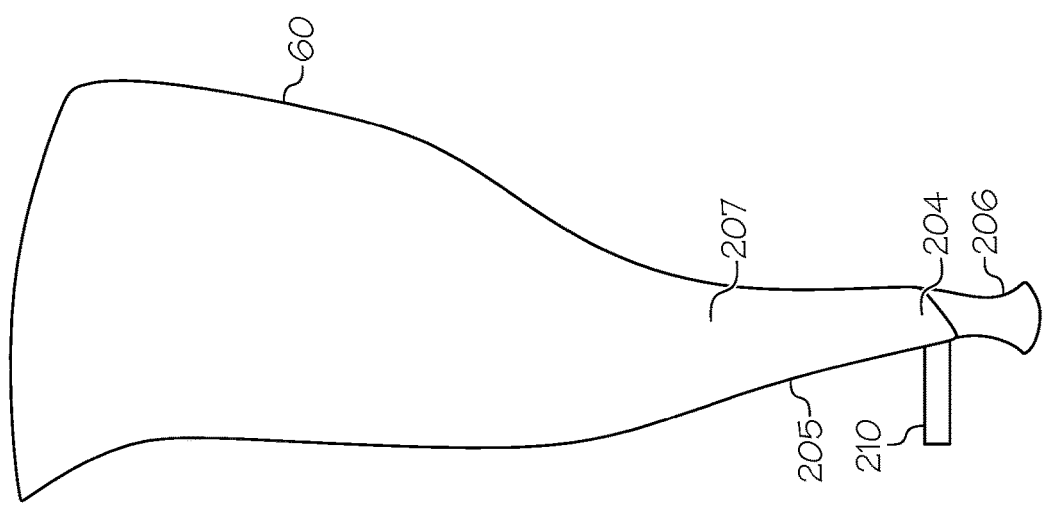
FIG. 3 is a forward looking aft diagrammatical view illustration of the blade illustrated in FIG. 1.

FIG. 2 illustrates how the turning lever 210 is connected and cammed to the spider arm 216 by a pin and slot joint 224. The turning lever 210 may include a joint slot 228 and the spider arm 216 may include a joint pin 226 that is disposed through the joint slot 228. The slot may be angled or curved to provide camming of the turning lever 210 with respect to the spider arm 216. The turning lever 210 is orthogonal or perpendicular to the engine centerline axis 12 and the pitch axis P. Referring to FIG. 1, axial movement of the actuator rods 220 while the fan blades 60 are rotating and is transmitted up to the ends of the spider arms 216 that are connected to the turning levers 210 which are pushed and rotates the fan blades 60 to the desired pitch angle or position. The position or pitch of the fan blade 60 can be defined in relation to a length of the actuator rods 220 that is translated in the axial direction.

In typical operation, air 27 is pressurized by the fan 14 and produces an inner or core airflow 15 channeled through the booster 16 which further pressurizes the core airflow 15. The pressurized air of the core airflow 15 is then flowed to the high pressure compressor 18 which further pressurizes the air. The pressurized air is mixed with fuel in the combustor 20 for generating hot combustion gases that flow downstream, in turn, through the HPT 22 and the LPT 24. Engine bearings (not shown) rotatably support the high pressure compressor 18 and the HPT 22 and rotatably support the fan 14 and the LPT 24.

A flow splitter 34 surrounding the booster 16 immediately behind the fan 14 includes a sharp leading edge 32 which splits the fan air 27 pressurized by the fan 14 into a radially inner stream (core airflow 15) channeled through the booster 16 and a radially outer stream or bypass airflow 17 is channeled into a bypass flow path 35 through a bypass duct 36 spaced radially outwardly from the booster 16. A fan casing 30 surrounding the fan 14 and the bypass duct 36 is supported by an annular fan frame 33 circumscribed about the engine centerline axis 12. The fan hub frame 56 is part of or connected to the fan frame 33.

The booster 16 includes alternating annular rows of booster blades and vanes 37, 42 extending radially outwardly and inwardly across a booster flowpath 39 in a booster duct 40. The annular row of booster blades 37 are suitably joined to the low pressure drive shaft 26. The booster 16 is located forward of the fan frame 33 and radially inboard of the flow splitter 34. The fan frame 33 includes an annular outer frame casing 54, the fan hub frame 56, and a plurality of circumferentially spaced apart duct struts 58 extending therebetween. The duct struts 58 are airfoil shaped.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A variable pitch fan assembly comprising:
  a plurality of variable pitch fan blades circumscribed about an engine centerline axis, the plurality of variable pitch fan blades coupled to a drive shaft centered about the engine centerline axis, each of the plurality of variable pitch fan blades being connected to a respective one of a plurality of blade turning levers and pivotable or rotatable about a respective one of a plurality of pitch axes perpendicular or normal to the engine centerline axis,
  one or more linear actuators non-rotatably mounted parallel to the engine centerline axis and operably linked to one or more of the plurality of variable pitch fan blades for pivoting or rotating the one or more of the plurality of variable pitch fan blades about the respective one or ones of the plurality of pitch axes, the one or more linear actuators connected to a spider ring through thrust bearings for transmission of axial displacement of non-rotatable actuator rods of the one or more linear actuators while the plurality of variable pitch fan blades is rotating, and
  a plurality of spider arms extending, axially along the engine centerline axis, away from the spider ring towards the plurality of variable pitch fan blades, wherein each one of the plurality of spider arms is connected to a respective one of the plurality of blade turning levers by a pin-and-slot joint.

2. The variable pitch fan assembly of claim 1, wherein each of the plurality of blade turning levers is orthogonal or perpendicular to the engine centerline axis and the respective one of the plurality of pitch axes.

3. The variable pitch fan assembly of claim 1, wherein each of the plurality of blade turning levers comprises a joint slot, and a respective one of the plurality of spider arms comprises a joint pin, the joint pin being disposed through the joint slot.

4. The variable pitch fan assembly of claim 3, wherein the joint slot is angled or curved for camming one of the plurality of blade turning levers with respect to one of the plurality of spider arms.

5. The variable pitch fan assembly of claim 4, wherein each of the plurality of blade turning levers is orthogonal or perpendicular to the engine centerline axis and the respective one of the plurality of pitch axes.

6. The variable pitch fan assembly of claim 1, wherein each of the plurality of blade turning levers is integral and monolithic with a blade root of one of the plurality of variable pitch fan blades and wherein each of the plurality of blade turning levers extends away from a pressure side or a suction side of airfoils of the plurality of variable pitch fan blades.

7. The variable pitch fan assembly of claim 6, wherein the one or more linear actuators are connected to a non-rotatable fan structure.

8. The variable pitch fan assembly of claim 7, wherein the non-rotatable fan structure is a fan hub frame.

9. The variable pitch fan assembly of claim 7, wherein each of the plurality of blade turning levers is connected and cammed to a respective one of the plurality of spider arms by the pin-and-slot joint.

10. The variable pitch fan assembly of claim 9, wherein each of the plurality of blade turning levers is orthogonal or perpendicular to the engine centerline axis and the respective one of the plurality of pitch axes.

11. The variable pitch fan assembly of claim 9, wherein each of the plurality of blade turning levers including a joint slot angled or curved for camming the respective one of the plurality of blade turning levers with respect to the plurality of spider arms, the respective one of the plurality of spider arms including a joint pin, the joint pin disposed through the joint slot.

12. An engine comprising:
a fan including a plurality of variable pitch fan blades circumscribed about an engine centerline axis, the plurality of variable pitch fan blades coupled to a drive shaft centered about the engine centerline axis, each of the plurality of variable pitch fan blades being pivotable or rotatable about a respective one of a plurality of pitch axes perpendicular or normal to the engine centerline axis, and each of the plurality of variable pitch fan blades having one of a plurality of blade turning levers integral and monolithic with a blade root of the corresponding one of the plurality of variable pitch fan blades,
a low pressure compressor or booster,
a high pressure compressor arranged in downstream serial flow communication and circumscribed about the engine centerline axis,
one or more linear actuators disposed radially inwardly of the booster and non-rotatably mounted parallel to the engine centerline axis and operably linked to one or more of the plurality of variable pitch fan blades for pivoting or rotating the one or more of the plurality of variable pitch fan blades about the respective one of the plurality of pitch axes, the one or more linear actuators connected to a spider ring through thrust bearings for transmission of axial displacement of non-rotatable actuator rods of the one or more linear actuators while the plurality of variable pitch fan blades is rotating, and
a plurality of spider arms extending away from the spider ring towards the plurality of variable pitch fan blades, each one of the plurality of spider arms connected to one of the plurality of blade turning levers.

13. The engine of claim 12, wherein the one or more linear actuators are disposed in a rotor of the engine.

14. The engine of claim 13, wherein each of the plurality of blade turning levers is connected and cammed to a respective one of the plurality of spider arms by a pin-and-slot joint and wherein each of the plurality of blade turning levers is orthogonal or perpendicular to the engine centerline axis and the respective one of the plurality of pitch axes.

15. The engine of claim 14, wherein each of the plurality of blade turning levers comprises a joint slot, and wherein the respective one of the plurality of spider arms comprises a joint pin, the joint pin disposed through the joint slot, and the joint slot being angled or curved for camming one of the plurality of blade turning levers with respect to one of the plurality of spider arms.

16. The engine of claim 15, wherein the one of the plurality of blade turning levers is connected to one of the plurality of variable pitch fan blades near at least one of a blade base or platform.

17. The engine of claim 16, wherein the one of the plurality of blade turning levers extends away from a pressure side or a suction side of airfoils of the plurality of variable pitch fan blades.

18. A variable pitch fan assembly comprising:
a plurality of variable pitch fan blades circumscribed about an engine centerline axis, each of the plurality of variable pitch fan blades rotatable about a pitch axis and coupled to a drive shaft centered about the engine centerline axis orthogonal to the pitch axes; and
a lever connected to a corresponding one of the plurality of variable pitch fan blades, and further connected to a corresponding spider arm by a pin-and-slot joint, wherein the corresponding spider arm extends axially along the engine centerline axis away from a spider ring towards the corresponding one of the plurality of variable pitch fan blades, and wherein the corresponding spider ring is configured to transmit axial displacement of one or more non-rotatable actuators to the lever.

19. The variable pitch fan assembly of claim 18, wherein the lever is integral and monolithic with a blade root of the corresponding one of the plurality of variable pitch fan blades.

\* \* \* \* \*